UNITED STATES PATENT OFFICE 2,044,337

ARSENATE-ALUMINATE-CEMENT

Johan Bertil Stålhane, Stockholm, Sweden, assignor to Bolidens Gruvaktiebolag, Stockholm, Sweden, a joint-stock company limited of Sweden No Drawing. Application February 19, 1935, Serial No. 7,255. In Sweden February 19, 1934

3 Claims. (Cl. 106—24)

The present invention relates to hydraulically binding cements or cement mixtures containing aluminium arsenate (compound of quinquevalent arsenic) together with lime or compounds rich in lime, such as calcium silicate, Portland cement, aluminate cement or similar products for technical purposes, and to a method of producing such cements and cement mixtures, as well as objects manufactured therefrom.

In hydrating the cement or the cement mixture, the aluminium arsenate reacts with the lime or the compounds rich in lime, difficultly soluble calcium arsenate thus being formed together with aluminium hydroxide (or calcium aluminate) in colloidal form. Hence, the cement will act as an aluminate cement. The reaction in question can be schematically signed as follows:

$$Al_2O_3 \cdot As_2O_5 + 2CaO = 2CaO \cdot As_2O_5 \cdot aq + Al_2O_3 \cdot aq$$

Of course, proportions and composed structure can vary considerably.

However, the aluminium arsenate may also be used as admixing agent for other cement types, such as Portland cement and ordinary aluminate cement (melted cement). The formation of calcium arsenate will then promote the resistance of the hardened cement mixture to dissolution of the same.

The aluminium arsenate is produced preferably by oxidation, f. i. by means of aerial oxygen, of arsenious acid ($As_2O_3$) that has been admixed with the other arsenate component, i. e. an aluminiferous material. This material will during the oxidation process act as a "carrier" of the arsenious acid and fixes the arsenic acid ($As_2O_5$) according as said latter acid is formed.

The aluminiferous material may consist of bauxite (type $Al_2O_3 \cdot 2H_2O$). However, a considerably cheaper product will be obtained if the arsenate is produced from clay (kaolin type $Al_2O_3 \cdot 2SiO_2 \cdot 2H_2O$). In this case, silicic acid is liberated at the formation of arsenate and remains in the product in a fine state of division. This finely divided silicic acid does not immediately influence the setting process upon the reaction of the aluminium arsenate with lime, but has an advantageous influence through after-fixation of lime being perhaps in excess.

As regards the oxidation process proper, the following statements may be given. The reaction $As_2O_3 + O_2 = As_2O_5 (+65$ kg. cal.) proceeds slowly at ordinary temperature (it is true) and the temperature range (upon oxidation by means of oxygen or air) is limited upwards on account of the displacement of the equilibrium of dissociation. However, at a moderately increased temperature (100 to 500° C.) and by the aid of catalyzers, f. i. iron, manganese or copper compounds or nitric acid, nitrates or nitrous fumes, the process can be carried out with sufficient quickness also in case of aerial oxygen.

In a view to elucidate the invention, the following example may be given. The arsenious acid, which constitutes the proper primary material, is admixed with an aluminiferous material (bauxite or clay) and this admixture is thereafter, perhaps in form of a sludge or a moist mass, treated in a continuous process by heating in the presence of air, so that a product being in a general way free from water is obtained, in which the arsenic has been combined as aluminium arsenate. Preferably, the process may be carried out in counter-current, f. i. in a rotating furnace, where the material by stirring is brought into good contact with the air. Unoxidized arsenious acid attaining high temperatures sublimates back with the air, and, thus, one obtains a certain security as to the non-existence of arsenious acid in the product (the arsenate or the cement). The product obtained through the oxidation process, which product is rich in aluminium arsenate, is finally admixed with the other constituents (burnt lime, slaked lime or other compounds rich in lime) of the cement or cement mixture.

Having thus described my invention I declare that what I claim is:

1. A cementitious mixture containing aluminium arsenate together with at least one of the following: lime, calcium silicate, Portland cement, aluminate cement, technical products rich in lime.

2. Objects produced from a cementitious mixture as claimed in claim 1.

3. A cementitious mixture, comprising an aluminium arsenate, together with at least one of the cement mixture constituents.

JOHAN BERTIL STÅLHANE.

Certificate of Correction

Patent No. 2,044,337.

June 16, 1936.

JOHAN BERTIL STÅLHANE

It is hereby certified that error appears in the printed specification of the above numbered patent requiring correction as follows: Page 1, second column, lines 46, 47, and 48, claim 3, strike out the comma and words ", is finally admixed with the other constituents (burnt lime, slaked lime or other ium arsenate together with at least one of the" and insert instead *of the kind produced by oxidation of arsenious acid in the presence of aluminiferous material admixed with other cement or;* and that the said Letters Patent should be read with this correction therein that the same may conform to the record of the case in the Patent Office.

Signed and sealed this 4th day of August, A. D. 1936.

[SEAL]

HENRY VAN ARSDALE,
*Acting Commissioner of Patents.*